2,944,936

POWDERED COMPOSITION CONSISTING ESSENTIALLY OF PENTACHLOROPHENOL AND A MEMBER OF THE GROUP OF METAL NAPHTHENATES AND MAHOGANY SULFONATES

Arthur H. Bronson, Van Nuys, Calif., assignor to Richfield Oil Corporation, Los Angeles, Calif., a corporation of Delaware No Drawing. Filed June 25, 1954, Ser. No. 439,460

7 Claims. (Cl. 167—31)

The present invention pertains to wood preservation and compositions for the treatment of wood and other cellulosic materials for the purpose of protecting them from the ravages of sapstain and decay organisms, fungi and insects. The invention relates specifically to compositions for this purpose containing pentachlorophenol, and has as its particular object to provide pentachlorophenol compositions in an improved form which will facilitate the preparation of such wood-treating compositions, will reduce the possible hazards to health incident to the handling of pentachlorophenol, and will inhibit the tendency of pentachlorophenol to corrode metallic apparatus such as that used for treating or impregnating cellulosic materials with the preservative compositions.

Pentachlorophenol has proved of outstanding value in the protection of wood and similar cellulosic material from attack by stain, decay and mold fungi, microorganisms, and insects. Pentachlorophenol, however, possesses certain undesirable physical and chemical properties. For instance, it is a very light material in powdered form and is easily blown about. Since pentachlorophenol is apt to produce irritation of the skin and mucous membranes of the nose and throat, pentachlorophenol in powdered form is a hazard, and special precautions are required in using such powdered material. Compacting or tableting pentachlorophenol reduces its tendency to dust or blow, but also increases its cost. In addition, hydrocarbon oil base preservative solutions containing as little as five percent or less by weight of pentachlorophenol will corrode the exposed metal surface of a retort used for treatment of wood with such preservative composition, although the hydrocarbon oil base is itself non-corrosive to metal surfaces.

In the present invention I have provided a wood preservative composition comprising pentachlorophenol embodying desirable fungicidal, insecticidal and bactericidal properties and having free-flowing characteristics and anti-dusting properties. Also, my invention provides a preservative composition comprising a hydrocarbon oil base solution of pentachlorophenol which is non-corrosive to metallic equipment such as that suitable for treating cellulosic materials with the preservative compositions.

It has been found in accordance with the present invention that the tendency of pentachlorophenol to form toxic dust can be successfully inhibited by the addition of relatively small amounts of oily corrosion inhibitors, such as alkali and alkaline earth metal naphthenates and mahogany sulfonates which have an oily consistency, to pentachlorophenol. For example, when oily alkali and alkaline earth metal naphthenates and sulfonates are added to pentachlorophenol, the resulting composition does not become a gummy mass, but rather, maintains free-flowing characteristics, and the tendency of pentachlorophenol to form toxic dust is successfully inhibited. The amount of oily inhibitor added must be sufficient to inhibit the dusting of pentachlorophenol and will usually range from about 2 to 10 weight percent of the pentachlorophenol. In a given instance less than 2% may be successful, and more than 10% can be employed but is unnecessary and uneconomical in most instances. Excessive amounts may destroy the desirable free-flowing characteristics of pentachlorophenol.

Further, it has been discovered that when a composition of pentachlorophenol containing oily alkali and alkaline earth metal naphthenates and mahogany sulfonates in amounts which effectively prevent dusting by pentachlorophenol is put into solution in a hydrocarbon oil which is a suitable solvent for pentachlorophenol, e.g., a mineral oil, fuel oil, solvent naphtha, pine oil, kerosene, etc., the resulting preservative composition is found to be non-corrosive to metal equipment such as that used for treating wood with preservative compositions, even though the equipment containing the preservative composition be subjected to high pressures and temperatures of the order ordinarily used in the pressure treatment of wood with preservatives. Although the pentachlorophenol composition may be included in the solvent in an amount up to its solubility limit, the solution usually contains from about 0.5 to 15 weight percent of pentachlorophenol based on a total composition, with 3 to 10% being preferred.

The following examples which demonstrate the improved pentachlorophenol compositions of this invention, are given by way of illustration only, and are not to be considered limiting.

*Example I*

Approximately 3 parts by weight of magnesium naphthenate was added to approximately 97 parts by weight of dry, powdered pentachlorophenol, the resulting mixture maintained the free-flowing characteristics of the untreated pentachlorophenol neither becoming gummy nor pasty. The absence of irritation of mucous membranes caused by toxic dust usually associated with dry, powdered pentachlorophenol was immediately noted.

*Example II*

Dry, powdered pentachlorophenol was treated with calcium naphthenate, the weight percentage of the two components being the same as those for the pentachlorophenol-magnesium naphthenate composition described in Example I. No irritation of mucous membranes was observed although the pentachlorophenol-calcium naphthenate composition maintained the free-flowing characteristics of untreated pentachlorophenol.

*Example III*

A 5% solution of untreated pentachlorophenol is prepared by adding the pentachlorophenol to cracked gas oil and placed in a suitable vessel with a clean piece of steel. The vessel is maintained at a temperature of about 220° F. and a pressure of about 100 p.s.i.g. for a period of about three hours, i.e., at conditions encountered in the pressure treatment of wood with preservative compositions. The vessel is allowed to slowly return to room temperature and atmospheric pressure. The piece of steel is removed, and appreciable corrosion is evident upon examination.

A 5% solution of the pentachlorophenol-magnesium naphthenate composition of Example I in cracked gas oil is prepared and placed in a suitable vessel with a clean piece of steel, and the vessel is subjected to the same conditions as described above. Upon examination the piece of steel after the treatment, no corrosion was observed. The pentachlorophenol solution is then employed to impregnate a wood sample by subjecting the wood to treatment by the preservative solution at a pressure of about 100 p.s.i.g. and a temperature of about 220° F. for about three hours.

Example IV

The procedure described in Example III is carried out using a 5% solution of the pentachlorophenol-calcium naphthenate composition of Example II. Examination of the steel sample after treatment reveals the absence of corrosion.

Example V 97 parts by weight of dry, powdered pentachlorophenol and 3 parts by weight of barium mahogany sulfonate are admixed. The composition is free-flowing and does not cause irritation of mucous membranes.

A 5% solution of the composition in cracked gas oil is then placed in a suitable vessel together with a clean piece of steel. Heating at 220° F. under about 100 p.s.i.g. pressure for three hours fails to cause any appreciable corrosion of the steel.

Example VI

The procedure of Example V is repeated employing calcium mahogany sulfonate to form a pentachlorophenol composition containing 3% calcium mahogany sulfonate and thereafter a 5% solution of such composition in cracked gas oil. The powdered pentachlorophenol calcium mahogany sulfonate composition is free-flowing and non-dusting, and the 5% solution is non-corrosive.

Example VII 2 parts by weight of magnesium naphthenate and 1 part by weight of calcium mahogany sulfonate are admixed with 97 parts by weight of dry, powdered pentachlorophenol to make a non-dusting free-flowing powder composition, which yields a 5% solution in cracked gas oil which is suitable for treating wood and is non-corrosive to the steel retort used in wood treatment under the conventional conditions of treatment.

Example VIII 2 parts by weight of a mixture of calcium, barium and sodium mahogany sulfonates in a 3:1:2 weight ratio are admixed with 98 parts by weight of pentachlorophenol to form a non-dusting, free-flowing powder suitable for admixture with a conventional solvent for pentachlorophenol in proportions of 0.5 to 15 weight percent of the powdered composition to form a non-corrosive pentachlorophenol wood treating solution.

I claim:

1. A free-flowing powder composition suitable for the preservation of cellulosic materials from decay, stain and mold fungi, and insects, consisting essentially of powdered solid pentachlorophenol and an oily material selected from the group consisting of alkali metal and alkaline earth metal naphthenates and mahogany sulfonates in an amount which imparts anti-dusting properties to the pentachlorophenol.
2. The composition of claim 1 in which the anti-dusting agent is calcium naphthenate.
3. The composition of claim 1 in which the anti-dusting agent is magnesium naphthenate.
4. The composition of claim 1 in which the anti-dusting agent is barium mahogany sulfonates.
5. The composition of claim 1 in which the anti-dusting agent is calcium mahogany sulfonate.
6. A free-flowing powder composition suitable for the preservation of cellulosic materials from decay, stain and mold fungi and insects, consisting essentially of powdered solid pentachlorophenol and about 2–10% of an oily material which imparts anti-dusting properties to pentachlorophenol selected from the group consisting of alkali metal and alkaline earth metal naphthenates and mahogany sulfonates based upon the weight of the pentachlorophenol.
7. The composition of claim 6 in which the oily material is calcium naphthenate.

References Cited in the file of this patent

UNITED STATES PATENTS

| | | |
|---|---|---|
| 1,679,919 | Rogers et al. | Aug. 7, 1928 |
| 2,315,064 | Littmann | Mar. 30, 1943 |
| 2,402,793 | White et al. | June 25, 1946 |
| 2,612,477 | Mitchell et al. | Sept. 30, 1952 |
| 2,615,815 | Galvin et al. | Oct. 28, 1952 |
| 2,756,120 | Lothringer | July 24, 1956 |

FOREIGN PATENTS

| | | |
|---|---|---|
| 36,077 | Denmark | June 7, 1926 |

OTHER REFERENCES

Schwartz et al.: Surface Active Agents, vol. 1, 1949, pp. 495–99 and 510–12.

Ind. and Eng. Chem., January 1949, p. 143.

Carswell et al.: Ind. and Eng. Chem. (November 1939), pp. 1431–1435, vol. 31, No. 11.

Reddish: "Antiseptics, Disinfectants, Fung. and Sterilization," 1954, p. 612.

Sperling: "J. of Ind. and Eng. Chem.," vol. 40, No. 5, 1948, pp. 890–896.